J. B. WAKEMAN & J. L. WAGER.
HORSE HAY RAKE.
No. 186,069. Patented Jan. 9, 1877.
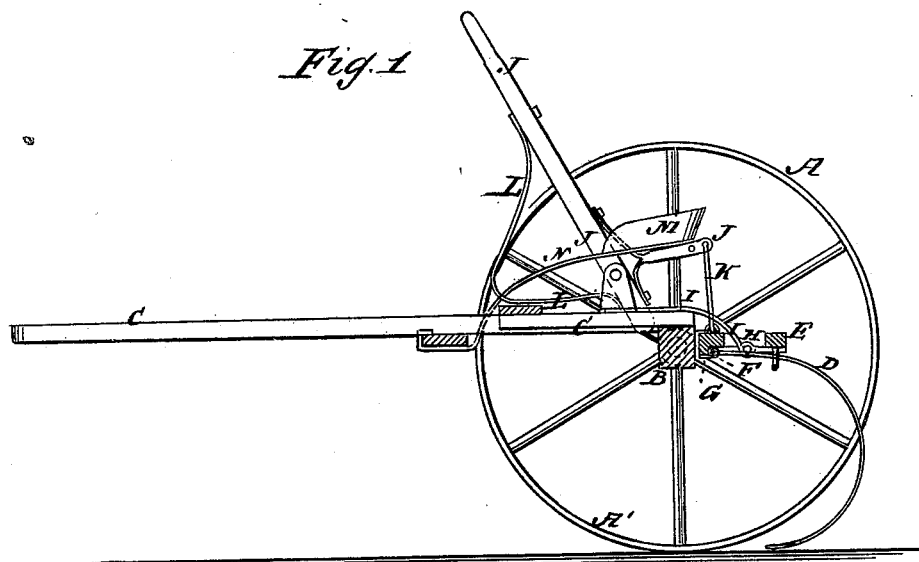
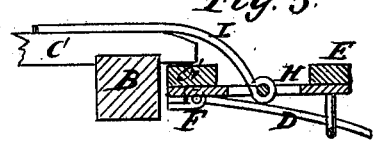
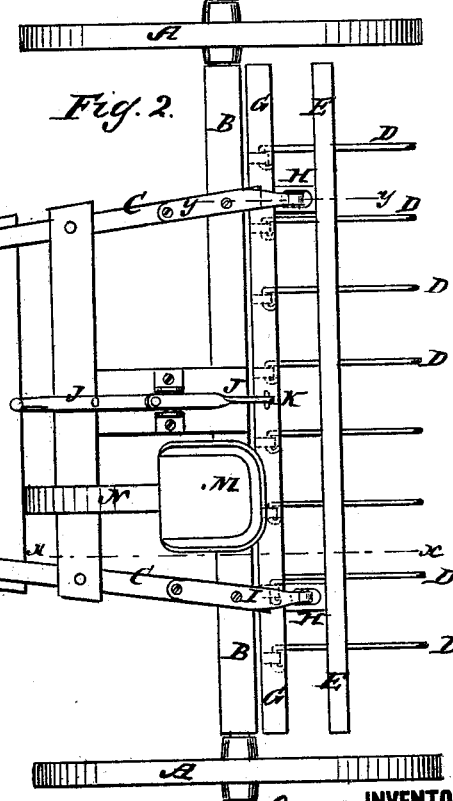
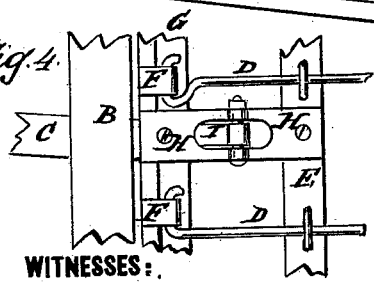
WITNESSES:
E. Wolff
John Goethals
INVENTOR:
J. B. Wakeman
J. L. Wager
ATTORNEYS.

UNITED STATES PATENT OFFICE.

JOSEPH B. WAKEMAN AND JOHN L. WAGER, OF DEPOSIT, NEW YORK.

IMPROVEMENT IN HORSE HAY-RAKES.

Specification forming part of Letters Patent No. 186,069, dated January 9, 1877; application filed April 10, 1876.

*To all whom it may concern:*

Be it known that we, JOSEPH B. WAKEMAN and JOHN L. WAGER, of Deposit, in the county of Broome and State of New York, have invented a new and Improved Horse Hay-Rake, of which the following is a specification:

Figure 1 is a vertical section of our improved rake, taken through line $x\,x$, Fig. 2. Fig. 2 is a top view of the same. Fig. 3 is a detail section, taken through the line $y\,y$, Fig. 2. Fig. 4 is a detail view of the under side of the axle and rake-head.

The object of the invention is to furnish an improved horse hay-rake simple in construction, convenient in use, and easily operated.

The invention consists in the construction and combination of parts, which will be hereinafter more fully described, and then pointed out in the claim.

A are the wheels, which revolve upon the journals of the axle B. C are the thills, which are rigidly attached to the axle B. D are the rake-teeth, which pass through keepers attached to the bar E, and their upper ends have eyes or hooks formed upon them to receive the eyes of straps F attached to the bar G. The bar E G form the rake-head, and are connected and held in their proper relative position by the bars or straps H. In the middle part of the bars H are formed slots, in which are pivoted the ends of the arms I, which are bolted to the axle B and thills C. This construction gives a large space beneath the rake-head for the collection of hay, and brings the pivots of said rake-head back, so that the teeth may be readily raised to discharge the collected hay. To a board attached to the axle B, and to a cross-bar of the thills C, is pivoted the bent lever J at its angle.

To the rear arm of the lever J is pivoted the upper end of a connecting-rod, K, the lower end of which is pivoted to the middle part of the bar G. The other arm of the lever J projects upward into such a position that it may be conveniently reached and operated by the driver from his seat. To the forward side of the upper arm of the lever J is attached a strap, L, which is so bent that its bend, when the teeth D are in working position, may rest upon the cross-bar of the thill C in such a position that the driver can rest his foot upon it to hold the rake to its work. By this construction, by drawing the upper end of the lever J to the rearward the teeth will be raised to discharge the collected hay. M is the driver's seat, the spring-standard N of which is attached to a cross-bar of the thills C.

Having thus described our invention, what we claim as new, and desire to secure by Letters Patent, is—

The combination of the bent lever J, the connecting-rod K, and the bent strap L, with the thills and axle C B, and with the bar G of the rake-head D E G, substantially as herein shown and described.

JOSEPH B. WAKEMAN
JOHN L. WAGER.

Witnesses:
A. J. BERNARD,
G. W. HOLMES.